United States Patent
Yang et al.

(10) Patent No.: US 9,236,803 B2
(45) Date of Patent: Jan. 12, 2016

(54) AC-DC FLYBACK CONVERTER AND LOOP COMPENSATION METHOD THEREOF

(75) Inventors: Zhe Yang, Beijing (CN); Xianhui Dong, Beijing (CN); Zhao Wang, Beijing (CN)

(73) Assignee: WUXI VIMICRO CORPORATION, Wuxi, Jiangsu (CN)

( * ) Notice: Subject to any disclaimer, the term of this patent is extended or adjusted under 35 U.S.C. 154(b) by 0 days.

(21) Appl. No.: 13/525,288

(22) Filed: Jun. 16, 2012

(65) Prior Publication Data

US 2013/0148388 A1    Jun. 13, 2013

Related U.S. Application Data

(63) Continuation of application No. PCT/CN2010/074401, filed on Jun. 24, 2010.

(30) Foreign Application Priority Data

Dec. 17, 2009 (CN) .......................... 2009 1 0243336

(51) Int. Cl.
H02M 3/335 (2006.01)

(52) U.S. Cl.
CPC ................................ H02M 3/33507 (2013.01)

(58) Field of Classification Search
CPC ....................... H02M 3/33523; H02M 3/33507
USPC ................................................ 363/21.12–18
See application file for complete search history.

(56) References Cited

U.S. PATENT DOCUMENTS

| | | | |
|---|---|---|---|
| 5,999,433 A * | 12/1999 | Hua et al. ....................... | 363/132 |
| 2004/0178784 A1 | 9/2004 | Okamoto | |
| 2008/0123380 A1 | 5/2008 | Park et al. | |

FOREIGN PATENT DOCUMENTS

| | | |
|---|---|---|
| CN | 1531181 A | 9/2004 |
| CN | 101515756 A | 8/2009 |
| CN | 101710794 A | 5/2010 |
| JP | 2004297915 A | 10/2004 |

OTHER PUBLICATIONS

AN1059 (Application Note, "Design Equations of High-Power-Factor Flyback Converters based on the L6561," C. Adragna, ST Microelectronics, Sep. 2003).*
SLOA079 ("Chapter 7: Voltage-Feedback OP AMP Compensation," R. Mancini, Texas Instruments, 2008).*
SLUU096 (Application Note, "Reference Design : Isolated 50 Watt Flyback Converter Using the UCC3809 Primary Side Controller," L. Dinwoodie, Texas Instruments, Jun. 2001).*
PIC-300 (Application Note, "BUCK Converter Control Cookbook," Z. Zhang, Alpha & Omega Semiconductor, Inc., Aug. 2008).*
International Search Report for PCT Application No. PCT/CT2010/074401.

* cited by examiner

*Primary Examiner* — Adolf Berhane
*Assistant Examiner* — Jye-June Lee
(74) *Attorney, Agent, or Firm* — Joe Zheng

(57) ABSTRACT

The prevent invention provides an AC-DC flyback converter and a loop compensation method thereof. The AD-DC flyback converter comprises an isolating transformer, a power switch, and a feed control module. The feed control module includes a compensating circuit, a voltage buffer, and an error amplifier having a first resistor and a second resistor, and a pulse width modulation controller. With the AC-DC flyback converter and the loop compensating method, the system stability can be improved and the loop bandwidth can be reduced.

11 Claims, 3 Drawing Sheets

AC-DC FLYBACK CONVERTER AND LOOP COMPENSATION METHOD THEREOF

CROSS REFERENCE TO RELATED APPLICATIONS

This application is a continuation of International Application No. PCT/CN2010/074401 filed on Jun. 24, 2010, which claims the priority of Chinese Patent Application No.: 200910243336.X filed on Dec. 17, 2009.

BACKGROUND OF THE INVENTION

1. Field of the Invention

The invention is related generally to the area of circuit designs, particularly to an AC-DC (Alternating Current to Direct Current) flyback converter and a loop compensation method thereof in discontinuous conduction mode (DCM).

2. Description of Related Art

In the electronic industry, higher performance of high-frequency switching power supply is always demanded. In the prior art, flyback converters are widely used for various low power supplies and power adapters due to simple circuit structure and inherent low cost.

These flyback converters are also referred to as buck-boost converters. An AC-DC flyback converter is derived from a buck-boost converter by adding an isolation transformer. The AC-DC flyback converters are configured for converting the alternating current into the direct current and are widely used in chargers for various portable devices and power adapters. Generally, the AC-DC flyback converters have two working modes, one is discontinuous conduction mode (DCM) and the other is continuous conduction mode (CCM). The AC-DC flyback converters work in the DCM mode for most applications. Thus, the AC-DC flyback converters in the present invention work in the DCM mode except for special cases.

FIG. 1 shows an exemplary circuit diagram of a conventional AC-DC flyback converter 100. The AC-DC flyback converter 100 includes a transformer T which includes a primary winding, a secondary winding, and an auxiliary winding. A controller 102 and a power switch 101 are provided one the side of the primary winding of the voltage transformer T. A rectifier diode D, an output capacitor $G_{out}$, an equivalent series resistor $R_{esr}$ of the output capacitor $G_{out}$, and a loading resistor $R_{load}$ are provided on the side of the secondary winding of the voltage transformer T. Two divider resistors $R_{fb1}$ and $R_{fb2}$ are provided at the side of the auxiliary winding of the voltage transformer T.

When the power switch 101 is turned on upon a pulse width modulation signal sent from the controller 102, an electric current runs through the primary winding of the voltage transformer T, where the voltage polarity of the upper end of the primary winding is positive, and the voltage polarity of the lower end of the primary winding is negative. However, the conducted voltage polarity of the upper end of the secondary winding is negative, the conducted voltage polarity of the lower end of the secondary winding is positive, and then the rectifier diode D is reverse biased to be turned off, thereby the power energy is stored in the voltage transformer T in the form of magnetic energy. When the power switch 101 is turned off, the voltage polarities of the two ends of the primary winding reverse, i.e., the polarity of the upper end of the primary winding is negative, and the polarity of the lower end of the primary winding is positive. The voltage polarities of the secondary winding also reverse, i.e., the polarity of the upper end of the secondary winding is positive, the polarity of the lower end of the secondary winding is negative, the rectifier diode D is turned on, and then the energy stored in the voltage transformer is delivered to the loading resistor $R_{load}$. The conversion from AC to DC is achieved.

Furthermore, the divider resistors $R_{fb1}$ and $R_f$ at the side of the auxiliary winding are provided for detecting the output voltage and providing a feedback voltage to the controller 102. Under lower power application environment in the prior art, the AC-DC flyback converter generally works on the discontinuous conduction mode (DCM), thereby the output voltage can be adjusted accurately, and some peripheral components with low cost and small size can use to reduce the production cost.

However, equivalent inductance L of the transformer T used in the AC-DC flyback converter 100 is usually larger (e.g., L=1.5 mH). A working frequency of the AC-DC flyback converter is usually from 40 KHz to 200 KHz in order to avoid electromagnetic interference (EMI). In real applications, the bandwidth of the system loop is required to be among ⅕ to 1/10 of the working frequency in order to keep stability of the feedback loop and depress noise interference. In other words, a high performance (stable and low noise) AC-DC flyback converter could be obtained if there is an enough phase margin in the lower unity gain bandwidth of the system loop. However, the AC-DC flyback converter in the prior art usually has a larger bandwidth of the system loop and a lower system stability.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to an AC-DC flyback converter and a loop compensation method thereof in a discontinuous conduction mode (DCM). One of the benefits, advantages and objects of this invention is that one embodiment of such an AC-DC flyback converter has a higher system stability and a lower bandwidth of the system loop.

The present invention may be implemented as a method, a circuit and a part of system. According to one embodiment, the present invention is an AC-DC flyback converter in a discontinuous conduction mode. The AC-DC flyback converter comprises an isolating transformer, a power switch and a feed control module. The isolating transformer comprises a primary winding configured for receiving an input voltage, a secondary winding configured for outputting a direct voltage, and an auxiliary winding configured for outputting a feedback signal. The power switch is coupled between a ground terminal and the primary winding of the isolating transformer and configured to switch on or off the primary winding of the isolating transformer according to a received pulse signal. The feed control module is coupled between the power switch and the auxiliary winding of the isolating transformer, and configured to send the pulse signal to the power switch according to the feedback signal outputted from the auxiliary winding.

The feed control module comprises: an compensating circuit having a first terminal coupled to an output terminal of the auxiliary winding of the isolating transformer and configured for receiving the feedback signal outputted by the auxiliary winding; an error amplifier having an inverse input terminal, an non-inverse terminal coupled to a reference voltage and an output terminal coupled to the input terminal of the error amplifier via a second resistor; a voltage buffer having an input terminal coupled to a second terminal of the compensating circuit and an output terminal coupled to the inverse input terminal of the error amplifier via a first resistor, and configured for isolating the compensating circuit from the error amplifier; and a pulse width modulation controller having a first input terminal coupled to the output terminal of the error amplifier, a second input terminal configured for receiving a sawtooth wave at a fixed frequency and an output terminal coupled to the power switch, and configured for sending the pulse signal to the power switch.

According to another embodiment, the present invention is loop compensation method of an AC-DC flyback converter. The method comprises: equipping an error amplifier having a first resistor and a second resistor into the AC-DC flyback converter; setting ratio of the second resistor to the first resistor to obtain a desired gain of the error amplifier, and increase frequency of an output pole of the error amplifier and frequency of a zero of the error amplifier; equipping a voltage buffer and a compensating circuit into the AC-DC flyback converter; and setting a resistance value of a resistor in the compensating circuit and a capacitance value of a capacitor in the compensating circuit to ensure frequency of a compensating pole of the compensating circuit to be equal to or less than frequency of an equivalent series resistance zero of an output capacitor of the AC-DC flyback converter.

There are many objects, features, and advantages in the present invention, which shall become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
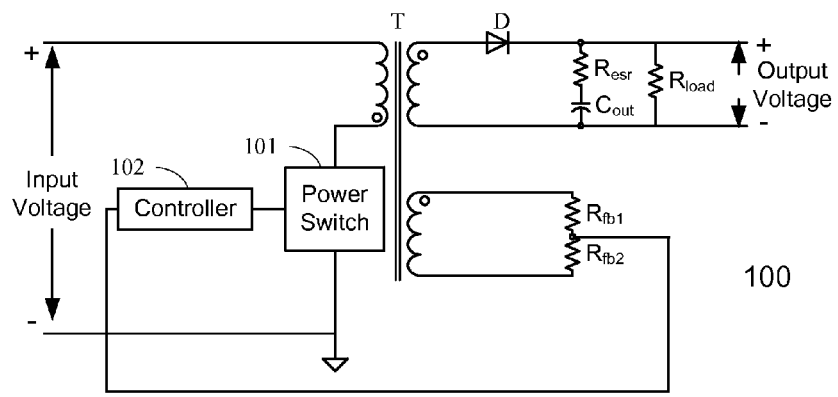
FIG. 1 is an equivalent circuit diagram of a conventional AC-DC flyback converter.
Figure 2:
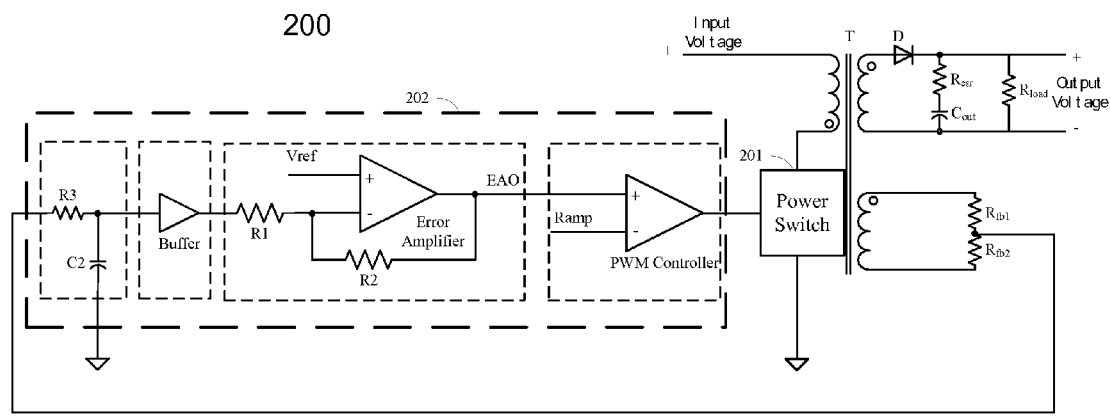
FIG. 2 is an equivalent circuit diagram of an AC-DC flyback converter according to one embodiment of the present invention.

FIG. 2 shows an exemplary circuit diagram of an AC-DC (Alternating Current To Direct Current) flyback converter 200 according to one embodiment of the present invention. The AC-DC flyback converter 200 includes an isolating transformer T, a power switch 201 and a feed control module 202. The isolating transformer T includes a primary winding configured for receiving an alternating input voltage, a secondary winding configured for outputting a direct output voltage, and an auxiliary winding configured for outputting a feedback signal.

The feed control module 202 is coupled between the power switch 201 and the auxiliary winding of the isolating transformer T and sends a pulse signal to the power switch 201 according to the feedback signal outputted from the auxiliary winding. The power switch 201 is coupled between a ground terminal and the primary winding of the isolating transformer T and switches on or off the primary winding of the isolating transformer T according to the received pulse signal.

As shown in FIG. 2, the feed control module 202 includes a pulse width modulation controller, an error amplifier having a first resistor and a second resistor, a voltage buffer and a compensating circuit. The compensating circuit has a first terminal coupled to an output terminal of the auxiliary winding of the isolating transformer and is configured for receiving the feedback signal (i.e., feedback voltage) outputted by the auxiliary winding. The voltage buffer has an input terminal coupled to a second terminal of the compensating circuit and is configured for isolating the compensating circuit from the error amplifier. The error amplifier includes an inverse input terminal coupled to an output terminal of the voltage buffer via the first resistor R1 and configured for receiving the feedback signal. The inverse input terminal of the error amplifier is coupled to an output terminal of the error amplifier via the second resistor R2. A non-inverse terminal of the error amplifier is coupled to a reference voltage Vref. The output terminal of the error amplifier is coupled to a first input terminal of the pulse width modulation controller and configured for outputting an error signal to the pulse width modulation controller. The error signal indicates an amplification result of the difference between the reference voltage and the feedback voltage (i.e., the feedback signal).

The pulse width modulation (PWM) controller has a first input terminal coupled to the output terminal of the error amplifier and configured for receiving the error signal, a second input terminal configured for receiving a ramp signal (e.g., a sawtooth wave at a fixed frequency), and an output terminal coupled to the power switch and configured for sending the pulse signal to the power switch.

According to one embodiment, the compensating circuit is a RC circuit includes a resistor R3 and a capacitor C2, and providing a first (RC) pole. The voltage buffer is configured to isolate the compensating circuit from the error amplifier to prevent a fixed gain of the error amplifier from being adversely affected by the compensating circuit.

Figure 3:
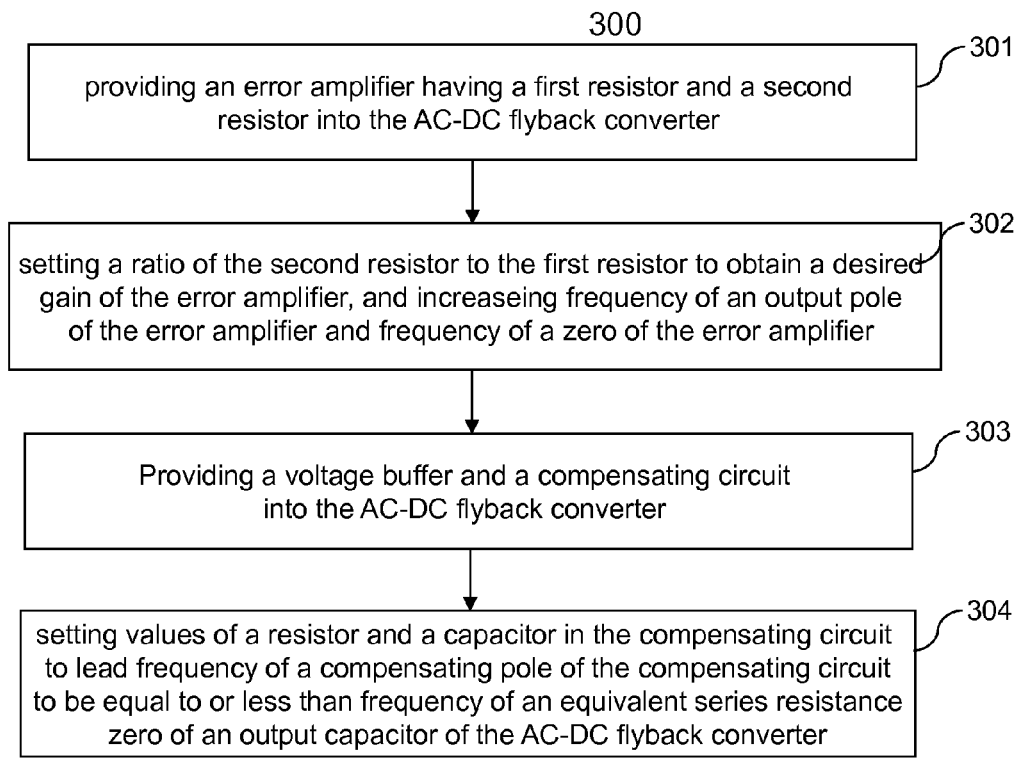
FIG. 3 is a flow chart showing a loop compensating method of the AC-DC flyback converter in one embodiment of the present invention.

FIG. 3 is a flowchart or process 300 of showing a loop compensating method used in the AC-DC flyback converter according to one embodiment of the invention. As shown in FIG. 3, the loop compensating method of the AC-DC flyback converter includes the following operations.

At 301, an error amplifier having a first resistor and a second resistor is employed into the AC-DC flyback converter. It may be seen from FIG. 2 that the error amplifier provided in one embodiment of the present invention includes the first resistor and the second resistor and has a negative feedback structure, which is different from a conventional error amplifier. The first resistor in the error amplifier is coupled between the output terminal of the voltage buffer and the inverse input terminal of the error amplifier. The resistance value of the first resistor is R1, and the first resistor is also referred to as R1 herein for convenience. The second resistor in the error amplifier is coupled between the inverse input terminal of the error amplifier and the out terminal of the error amplifier. The resistance value of the second resistor is R2, and the second resistor is also referred to as R2 herein for convenience. Thereby, the error amplifier with the first resistor and the second resistor forms a negative feedback structure with a fixed gain.

Figure 4:
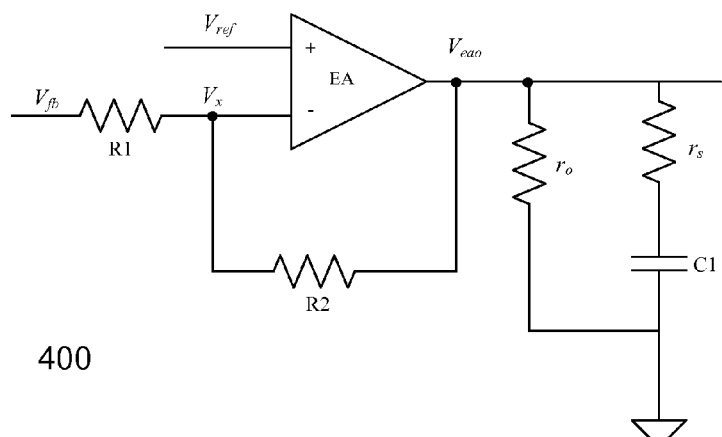
FIG. 4 is an equivalent circuit diagram of an error amplifier having a negative feedback structure in one embodiment of the invention.

At 302, the ratio of the second resistor to the first resistor of the error amplifier is set to obtain a desired gain of the error amplifier and increase the frequency of an output pole of the error amplifier and frequency of a zero of the error amplifier. As an example, FIG. 4 shows an exemplary circuit 400 of the error amplifier having the negative feedback structure according to one embodiment of the present invention. The gain of the output terminal of the error amplifier to the inverse input terminal of the error amplifier is determined by the ratio of R2 to R1. In one embodiment of the present invention, the values of R1 and R2 or the ratio of R2 to R1 can be set according to actual conditions, thereby obtaining the desired gain of the error amplifier. For example, in actual applications, the low-frequency gain of the output terminal EAO to the inverse input terminal of the error amplifier is within 30~40 dB, which is far less than the low-frequency gain multiple (generally 70~80 dB) of the output terminal EAO to the inverse input terminal of the conventional error amplifier, by setting the values of R1 and R2 or the ratio of R2 to R1, thereby causing the system loop to decrease to unity gain at a lower frequency on condition that the pole position remains unchanged.

Furthermore, the zero and the pole of the error amplifier having the negative feedback structure can be calculated according to the equivalent circuit shown in FIG. 4. Specifically, following equations can be obtained according to the equivalent circuit shown in FIG. 4.

$$\frac{V_{fb} - V_x}{R1} = \frac{V_x - V_{eao}}{R2} \quad (1)$$

$$V_x \cdot (-Gm) \cdot req = V_{eao}, \text{ and } req = r_o // \left(r_s + \frac{1}{C1 \cdot s}\right) \quad (2)$$

where $V_{fb}$ is an output voltage of the voltage buffer, $V_{fb}$ also is an input voltage of the resistor R1. Vx is an input voltage of the error amplifier. Veao is an output voltage of the error amplifier. Gm is the gain of the error amplifier. S is a unit of the complex frequency. $r_0$ is an output impedance of the error amplifier. C1 is a load capacitor of the error amplifier. $r_s$ is a parasitic series resistance of the load capacitor C1 of the error amplifier. Furthermore, Vref is the reference voltage inputted into the non-inversed terminal of the error amplifier.

According to equations (1) and (2), the following equation can be obtained:

$$\frac{V_{eao}}{V_{fb}} = \frac{R2}{R1} \cdot \frac{r_s \cdot C1 \cdot s + 1}{\left[r_s + \frac{(1 + R2/R1) \cdot (r_o + r_s)}{Gm \cdot r_o}\right] \cdot C1 \cdot s + \left[1 + \frac{(1 + R2/R1)}{Gm \cdot r_o}\right]} \quad (3)$$

According to equation (3), the following equations can be derived:

$$\omega_p = \frac{1}{\left[r_s + \frac{(1 + R2/R1)}{Gm}\right] \cdot C1} \quad (4)$$

$$\omega_z = \frac{1}{r_s \cdot C1} \quad (5)$$

Accordingly, the frequency $\omega_p$ of the output pole of the error amplifier and the frequency $\omega_z$ of the output zero of the error amplifier can be got according to equations (4) and (5). In prior arts, the frequency of the output pole of the conventional error amplifier is listed as follows:

$$\omega_{p_0} = \frac{1}{r_0 \cdot C1} \quad (6)$$

As the output impedance $r_0$ is usually very large, equation $\omega_p \gg \omega_{p_0} = 1/(r_o \cdot C1)$ can be concluded from the equations (4) and (6). Namely, the frequency of the output pole of the error amplifier having the negative feedback structure has been increased greatly relative to the conventional error amplifier, thereby improving the stability of the system.

Moreover, as the value of the output capacitor Cout of the flyback converter is generally very large (e.g., 470 to 680 μF), which cause the frequency of the equivalent series resistance (ESR) zero of the output capacitor of the flyback converter to be very low. Thus, in one embodiment of the prevent invention, a lower value is assigned to R1 when the ratio of R2 to R1 is set, which may push the frequency of the output zero of the error amplifier to a higher level, in order to depress adverse effect of the output zero of the error amplifier on the bandwidth and the phase margin.

At 303, a voltage buffer and a compensating circuit is equipped into the AC-DC flyback converter. In the embodiment of the present invention, the error amplifier having the negative feedback structure can greatly increase the frequency of the output pole of the error amplifier and decrease a loop gain of the whole system. However, if only the error amplifier having the negative feedback structure is employed in the AC-DC flyback converter, the whole AC-DC flyback converter would have only one output pole p1 and one ESR zero z1 of the output capacitor at lower frequency. The frequency $\omega_{p_1}$ of the output pole of the flyback converter is:

$$\omega_{p_1} = \frac{1}{R_{load} \cdot C_{out}}.$$

The frequency $\omega_{z_1}$ of the ESR zero of the output capacitor is:

$$\omega_{z_1} = \frac{1}{r_{esr} \cdot C_{out}}.$$

For all that, the unity gain bandwidth is still great. Therefore, it is feasible to add a suitable pole to decrease the unity gain bandwidth. In the above equations, $R_{load}$ is a loading resistor of the secondary winding of the transformer. $C_{out}$ is an output capacitor of the secondary winding of the transformer. $R_{esr}$ is an equivalent series resistance of the output capacitor $C_{out}$.

Thus, in one embodiment of the present invention, it is feasible to equip a voltage buffer and a compensating circuit to the AC-DC flyback converter. Namely, the voltage buffer and the compensating circuit are coupled between the inverse input terminal of the error amplifier and the output terminal of the auxiliary winding of the isolating transformer. The compensating circuit is a RC circuit including a third resistor and a third capacitor. The voltage buffer is configured for isolating the RC circuit and the error amplifier so as to prevent a fixed gain of the error amplifier from being adversely affected by the RC circuit. The RC circuit is configured for providing a first RC pole (called as a compensating pole p2).

At 304, values of the resistor and the capacitor in the compensating circuit are set to lead the frequency of the compensating pole of the compensating circuit to be equal to or less than the frequency of the equivalent series resistance zero of the output capacitor of the AC-DC flyback converter. In one embodiment of the present invention, the frequency of the compensating pole $p_2$ can be modulated to be equal to the frequency of the ESR zero $z_1$ of the output capacitor of the AC-DC flyback converter by setting suitable values to the resistor and the capacitor in the RC circuit, thereby canceling effect of the ESR zero $z_1$ of the output capacitor of the AC-DC flyback converter on the unity gain bandwidth.

The frequency of the compensating pole $p_2$ is:

$$\omega_{p2} = \frac{1}{R3 \cdot C2}$$

The frequency of the ESR zero of the output capacitor is:

$$\omega_{z1} = \frac{1}{R_{esr} \cdot C_{out}}$$

So, when $\omega_{p_2}$ is equal to $\omega_{z_1}$ the following equation is got:

$$R3 \cdot C2 = R_{esr} \cdot C_{out} \quad (7).$$

Therefore, when the output capacitor of the flyback converter is determined, the values of the resistor and the capacitor in the RC circuit can be calculated according to the frequency of the ESR zero $z_1$ of the output capacitor. Furthermore, it can be seen from the equation (7) that the values of the resistor and the capacitor in the RC circuit can be set according to the actual requirements to cause the added compensating pole and the ESR zero of the output capacitor of the flyback converter to offset each other, i.e., $\omega_{p2} = \omega_{z1}$, when the product of the values of the resistor and the capacitor remains constant and to be equal to the product $R_{esr} \cdot C_{out}$.

Figure 5:
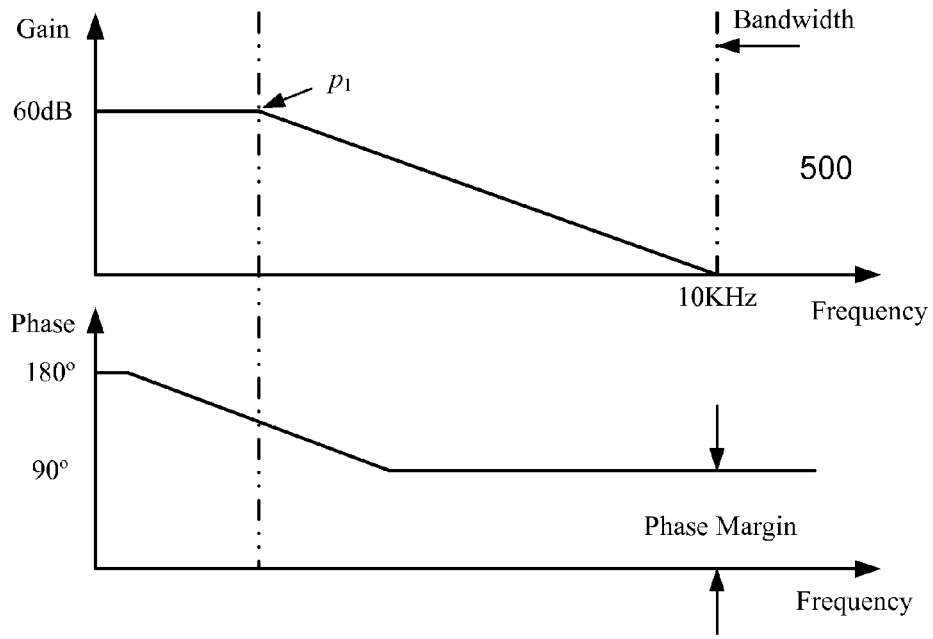
FIG. 5 is a schematic diagram showing a loop bandwidth and a phase margin of the AC-DC flyback converter in one embodiment of the present invention.

FIG. 5 is a schematic diagram showing a loop bandwidth and a phase margin of the flyback converter in one embodiment of the present invention. As shown in FIG. 5, the additional compensating pole provided by the compensating circuit offset the ESR zero of the output capacitor of the flyback converter in the embodiment of the present invention, thereby ensuring the flyback converter to be a single pole system at lower frequency. Furthermore, the low-frequency gain of the output terminal EAO to the inverse terminal of the error amplifier can be adjusted by changing the values of R1 and R2 or the ratio of R2 to R1, thereby ensuring the low-frequency gain of the system loop to be a desired value (e.g., 60 db shown in FIG. 5). Because the output capacitor of the flyback convert is generally very large, the frequency of the main pole is usually 10 to 15 Hz during heavy load (i.e., the output resistance of the flyback convert is low). Thus, the unity gain bandwidth of the single pole system is 10 to 15 KHz, thereby satisfying the requirement of low bandwidth. Moreover, the phase margin is definitely larger that 60 degrees because there is only one pole, thereby satisfying the requirement of stability.

In another embodiment of the present invention, the frequency of the compensating pole $p_2$ is designed to be less than or equal to the frequency of the ESR zero $z_1$ of the output capacitor of the flyback converter so as to further decrease the bandwidth of the system loop. For example, $\omega_{p2} = n\omega_{z1}$, and $0.5 \leq n \leq 1$, wherein n can be determined according to actual requirement. Preferably, n is 0.75. According to $\omega_{p2} = n\omega_{z1}$, another equation $n \cdot R3 \cdot C2 = R_{esr} \cdot C_{out}$ (8) can be obtained. After the value of n is determined, the equation (8) can be satisfied by setting suitable values to R3 and C2.

Figure 6:
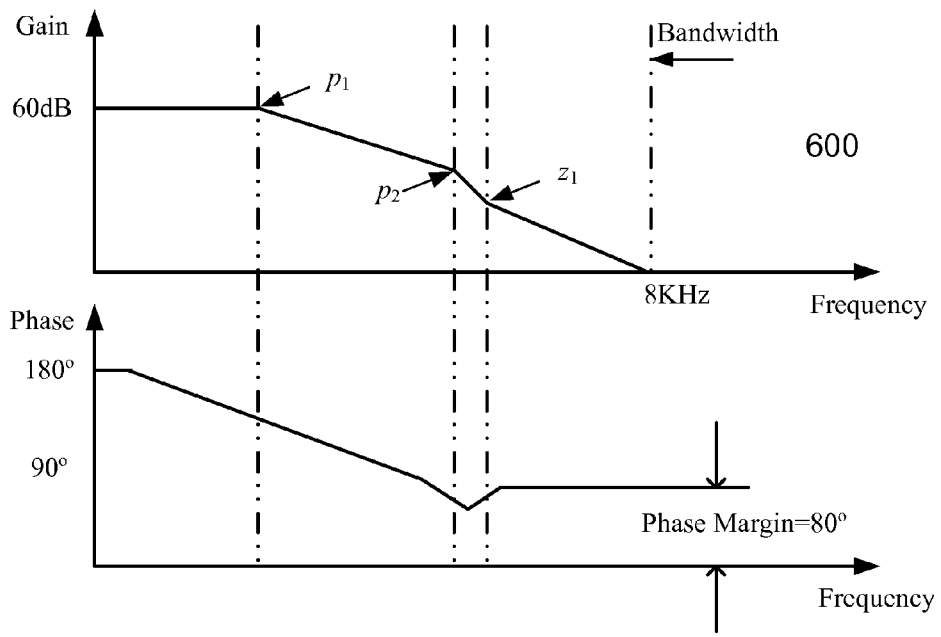
FIG. 6 is a schematic diagram showing the loop bandwidth and the phase margin of the AC-DC flyback converter in another embodiment of the present invention.

FIG. 6 is a schematic diagram showing the loop bandwidth and the phase margin of the flyback converter in another embodiment of the present invention. As shown in FIG. 6, the unity gain bandwidth of the system is decreased effectively and the phase margin is also larger that 60 degrees because the flyback converter has two poles and one zero in the embodiment of the present invention, thereby improving the stability of the system and decreasing the bandwidth of the system loop.

Furthermore, the frequency of the output pole of the flyback converter in light load is less than that in heavy load because the output resistance of the flyback converter in light load is larger than that in heavy load. Thus, the bandwidth of the system loop of the flyback converter in light load must satisfy the requirement of low bandwidth of the system loop if the bandwidth of the system loop of the flyback converter in heavy load satisfies the requirement of low bandwidth of the system loop, provided that the circuit structure remains unchanged.

In brief, the error amplifier having the negative structure and the compensating circuit are used in the AC-DC flyback converter and the loop compensation method at the discontinuous conduction mode. The ratio of the second resistor to the first resistor of the error amplifier can be adjusted to achieve the desired gain of the error amplifier and increase the frequency of the output pole of the error amplifier and the frequency of the zero of the error amplifier. The values of the resistor and the capacitor in the compensating circuit can also be adjusted to ensure the frequency of the compensating pole of the compensating circuit to be equal to or less than the frequency of the ESR zero of the output capacitor of the AC-DC flyback converter. Thereby, the stability of the system is improved effectively and the bandwidth of the loop system is decreased.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. An AC-DC flyback converter comprising:

an isolating transformer including a primary winding configured for receiving an input voltage, a secondary winding configured for outputting a direct voltage, and an auxiliary winding configured for outputting a feedback signal;

a power switch coupled between a ground and the primary winding of the isolating transformer and configured to switch on or off the primary winding of the isolating transformer according to the feedback signal from the auxiliary winding; and a feedback control module coupled between the power switch and the auxiliary winding of the isolating transformer, configured to send the feedback signal to the power switch, wherein the feedback control module comprises:

a compensating circuit having a first input coupled to an output terminal of the auxiliary winding of the isolating transformer and configured for receiving the feedback signal therefrom, wherein the compensating circuit includes a resistor and a capacitor to provide a compensating pole, the resistor is provided to receive the feedback signal being divided by a set of two resistors in series coupled to the auxiliary winding to receive the feedback signal;

an error amplifier having an inverse input, a non-inverse input coupled to a reference and an output terminal coupled to the inverse input thereof via a second resistor wherein frequency $\omega_p$ of an output pole of the error amplifier is obtained according to a following equation:

$$\omega_p = \frac{1}{\left[r_s + \frac{(1 + R2/R1)}{Gm}\right] \cdot C1},$$

where R1 and R2 are resistance values of two resistors in the error amplifier, C1 is a load capacitor of the error amplifier, $r_s$ is a parasitic series resistance of the load capacitor C1 of the error amplifier, and Gm is a gain of the error amplifier;

a voltage buffer having an input coupled to the output terminal of the compensating circuit and an output coupled to the inverse input of the error amplifier via a first resistor, and configured for isolating the compensating circuit from the error amplifier; and a controller having a first input coupled to the output terminal of the error amplifier, a second input configured for receiving a control signal and an output terminal coupled to the power switch.

2. The converter according to claim 1, wherein the controller is a pulse width modulation controller receiving a sawtooth wave at a fixed frequency.

3. The converter according to claim 2, wherein the resistor in the compensating circuit is provided between the two resistors in series and the input of the voltage buffer while the capacitor of the compensating circuit is provided between the resistor of the compensating circuit and a ground.

4. The converter according to claim 1, wherein resistance values of the two resistors in series is controlled to maintain a ratio so as to increase the frequency of the output pole and a frequency of a zero of the error amplifier.

5. A loop compensation method for an AC-DC flyback converter, the method comprising:

providing an error amplifier having a first resistor and a second resistor in the AC-DC flyback converter including an isolating transformer having a primary winding configured for receiving an input voltage, a secondary winding configured for outputting a direct voltage, and an auxiliary winding configured for outputting a feedback signal, wherein frequency $\omega_p$ of an output pole of the error amplifier is obtained according to a following equation:

$$\omega_p = \frac{1}{\left[r_s + \frac{(1 + R2/R1)}{Gm}\right] \cdot C1},$$

where R1 is a resistance value of the first resistor, R2 is a resistance value of the second resistor C1 is a load capacitor of the error amplifier, $r_s$ is a parasitic series resistance of the load capacitor C1 of the error amplifier, and Gm is a gain of the error amplifier;

setting a ratio of the second resistor to the first resistor to obtain a desired gain of the error amplifier, and increase the frequency of the output pole and a frequency of a zero of the error amplifier;

providing a voltage buffer and a compensating circuit into the AC-DC flyback converter, wherein the compensating circuit includes a resistor and a capacitor to provide a frequency of a compensating pole, the resistor is provided to receive the feedback signal being divided by a set of two resistors in series coupled to the auxiliary winding to receive the feedback signal; and setting a resistance value of the resistor and a capacitance value of the capacitor in the compensating circuit to ensure the frequency of the compensating pole of the compensating circuit to be equal to or less than a frequency of an equivalent series resistance zero of an output capacitor of the AC-DC flyback converter.

6. The method according to claim 5, wherein a desired gain of the error amplifier is 30 dB to 40 dB.

7. The method according to claim 5, wherein frequency $\omega_z$ of the zero of the error amplifier is calculated according to a following equation:

$$\omega_z = \frac{1}{r_s \cdot C1},$$

where C1 is a load capacitance of the error amplifier, and $r_s$ is a parasitic series resistance of the load capacitor C1 of the error amplifier.

8. The method according to claim 5, wherein the resistor of the compensating circuit is provided between the two resistors in series and an input of the voltage buffer while the capacitor is provided between the resistor of the compensating circuit and a ground.

9. The method according to claim 5, wherein the voltage buffer is configured for isolating the compensating circuit from the error amplifier.

10. The method according to claim 5, wherein the frequency of the compensating pole of the compensating circuit is n times the frequency of the equivalent series resistance zero of the output capacitor of the flyback converter, wherein $0.5 \leq n \leq 1$.

11. The method according to claim 10, wherein n is 0.75.

* * * * *